(12) United States Patent
Iseki

(10) Patent No.: US 6,949,868 B2
(45) Date of Patent: Sep. 27, 2005

(54) SURFACE ACOUSTIC WAVE ACTUATOR AND DEFLECTOR EMPLOYING THE SAME

(75) Inventor: Takayuki Iseki, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/743,156

(22) Filed: Dec. 23, 2003

(65) Prior Publication Data

US 2004/0135470 A1 Jul. 15, 2004

(30) Foreign Application Priority Data

Dec. 27, 2002 (JP) .................................... P2002-381444

(51) Int. Cl.[7] .............................................. H01L 41/08
(52) U.S. Cl. ............................. 310/323.02; 310/313 R
(58) Field of Search ............................ 310/311, 313 R, 310/323.02

(56) References Cited

U.S. PATENT DOCUMENTS

| | | | | |
|---|---|---|---|---|
| 4,752,711 A | * | 6/1988 | Tsukimoto et al. | 310/323.11 |
| 5,006,749 A | * | 4/1991 | White | 310/323 |
| 5,821,669 A | * | 10/1998 | Shin | 310/323.03 |
| 6,285,113 B1 | * | 9/2001 | Asai et al. | 310/313 R |
| 6,331,747 B2 | * | 12/2001 | Yoshida et al. | 310/313 R |
| 6,710,511 B2 | * | 3/2004 | Asai | 310/313 R |

FOREIGN PATENT DOCUMENTS

| | | |
|---|---|---|
| JP | 06-180428 | 6/1994 |
| JP | 08-032227 | 2/1996 |
| JP | 11-285279 | 10/1999 |

OTHER PUBLICATIONS

M. Kurosawa et al., "Ultrasonic Linear Motor Using Surface Acoustic Waves", Sep. 1996, IEEE transactions on Ultrasonics, Ferroelectrics, and Frequency Control, vol. 43, No. 5, pp. 47–52.

* cited by examiner

Primary Examiner—Mark Budd
(74) Attorney, Agent, or Firm—Nath & Associates PLLC; Gary M. Nath; Gregory B. Kang

(57) ABSTRACT

A surface acoustic wave actuator has a mover arranged on a first surface of a piezoelectric board and comb-shaped electrodes formed on the first surface. High frequencies are applied to the comb-shaped electrodes to generate Rayleigh waves that move the mover. In the surface acoustic wave actuator, the com-shaped electrodes include first to fourth electrodes formed on the first surface of the piezoelectric board, the first and third comb-shaped electrodes being on each side of the mover on an X-axis, the second and fourth comb-shaped electrodes being on each side of the mover on a Y-axis. The mover at least has a permanent magnet. The surface acoustic wave actuator further has a unit to selectively apply a high frequency to at least one of two electrodes one selected from the first and third comb-shaped electrodes and the other from the second and fourth comb-shaped electrodes. The surface acoustic wave actuator also has a mover holder facing the mover with the piezoelectric board interposed therebetween. The mover holder at least has a magnetic material configured to hold the mover.

2 Claims, 12 Drawing Sheets

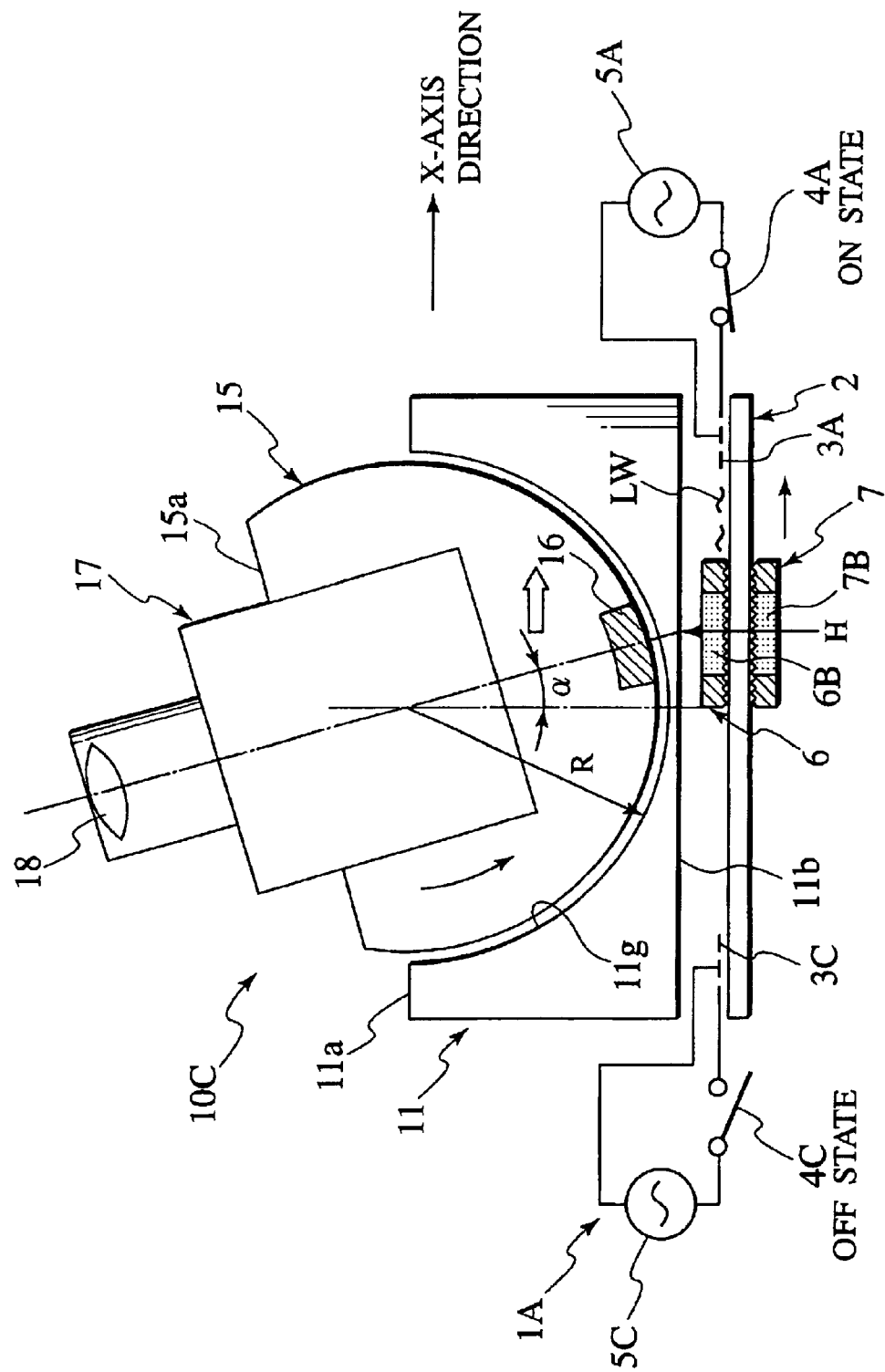

SURFACE ACOUSTIC WAVE ACTUATOR AND DEFLECTOR EMPLOYING THE SAME

BACKGROUND OF THE INVENTION

1. Field of the Invention

The present invention relates to a surface acoustic wave actuator and a deflector employing the same.

2. Description of Related Art

Surface acoustic wave actuators generally demonstrate excellent working performance such as high speed, high thrust, and high resolution, and due to this, they are actively researched and developed for linear actuators, etc.

FIGS. 1A and 1B are perspective views explaining a surface acoustic wave actuator according to a related art 1, in which FIG. 1A schematically shows the structure of the surface acoustic wave actuator (or motor) and FIG. 1B shows a concept of frictional drive by Rayleigh waves.

In FIG. 1A, the surface acoustic wave actuator 100 of the related art 1 is developed as, for example, a surface acoustic wave motor. The surface acoustic wave actuator 100 has a piezoelectric board 101 made of, for example, lithium niobate and having a rectangular shape. At right and left ends on a top surface 101a of the piezoelectric board 101, comb-shaped electrodes 102A and 102B are formed by, for example, vapor deposition. The comb-shaped electrodes 102A and 102B are connected to high-frequency power sources 104A and 104B through switches 103A and 103B, respectively. On the top surface 101a of the piezoelectric board 101, a slider 105 which is preloaded is movably arranged between the comb-shaped electrodes 102A and 102B.

If the right switch 103A, for example, is turned on, a high frequency is supplied from the high-frequency power source 104A to the comb-shaped electrode 102A. The high frequency converts to Rayleigh waves LW that advance from the right side toward the left side in the direction of an arrow mark X2 on the piezoelectric board 101. The Rayleigh waves LW propagate along the piezoelectric board 101 to move the preloaded slider 105 against the Rayleigh waves LW in the direction of an arrow mark X1. At this time, the left switch 103B is kept OFF.

In FIG. 1B, Rayleigh waves LW cause surface particles of the piezoelectric substrate 101 to rotate in elliptic loci, to thereby move the slider 105 that is in contact with the heads of the Rayleigh waves LW in the direction X1 by frictional drive. At this time, some load must be applied to the slider 105 from above the same to produce a sufficient friction. Without such friction, the slider 105 may simply oscillate up and down. Accordingly, the slider 105 is preloaded with, for example, the own weight thereof or with a spring (not shown).

If the piezoelectric board 101 with the preloaded slider 105 is inclined or is installed upside down, the slider 105 will drop off the piezoelectric board 101. Therefore, the piezoelectric board 101 of the related art 1 is limited to applications that set the piezoelectric board 101 substantially horizontally.

To prevent the slider 105 from dropping off the piezoelectric board 101, a measure is taken in another related art (for example, Japanese Unexamined Patent Application Publication Hei-11(1999)-285279 (page 3, FIG. 1)).

FIG. 2 is a perspective view explaining a surface acoustic wave actuator according to a related art 2.

The surface acoustic wave actuator 200 of the related art 2 shown in FIG. 2 corresponds to the one disclosed in the Japanese Unexamined Patent Application Publication Hei-11(1999)-285279. With reference also to the publication, the surface acoustic wave actuator 200 will briefly be explained.

In FIG. 2, the surface acoustic wave actuator 200 of the related art 2 has a piezoelectric board 201 having a top surface 201a. At left and right ends on the top surface 201a, comb-shaped electrodes 202A and 202B are formed, respectively. When one of the comb-shaped electrodes 202A and 202B receives a voltage from a high-frequency power source (not shown), it generates surface acoustic waves on the piezoelectric board 201.

A mover 203 is set on the piezoelectric board 201 in a path where surface acoustic waves advance. The mover 203 consists of a mover base 203A having many fine protrusions in contact with the top surface 201a of the piezoelectric board 201, a permanent magnet 203B set on the mover base 203A, and a channel-shaped magnetic yoke 203C made of soft magnetic material and serving as a magnetic shield structure for the permanent magnet 203B. These parts 203A to 203C are integrated into one.

The piezoelectric board 201 has an under surface 201b to which a channel-shaped magnetic guide 204 made of soft magnetic material and serving as a linear drive guide is attached in a longitudinal direction (Y-axis direction) of the piezoelectric board 201. On each side of the piezoelectric board 201, the channel-shaped magnetic yoke 203C of the mover 203 and the channel-shaped magnetic guide 204 face each other to produce a magnetic circuit between them. As a result, the mover 203 is preloaded toward the channel-shaped magnetic guide 204 behind the piezoelectric board 201.

When a high-frequency voltage is applied to, for example, the left comb-shaped electrode 202A, surface acoustic waves are generated to serve as a drive source to move the mover 203 in the direction of an arrow mark Y1 along the channel-shaped magnetic guide 204. When the channel-shaped magnetic yoke 203C of the mover 203 and the channel-shaped magnetic guide 204 face each other, magnetic attraction force produced thereby is maximum and stable to return the mover 203 to an original X-axis position even if the mover 203 widthwise deviates from the original X-axis position. If a voltage is applied to the other comb-shaped electrode 202B to generate surface acoustic waves serving as a drive source, the mover 201 advances in an opposite direction from the direction mentioned above.

In this way, the mover 203 is set on the top surface 201a of the piezoelectric board 201, and the linear magnetic guide 204 is attached to the under surface 201b of the piezoelectric board 201. This arrangement allows the piezoelectric board 201 to be inclined, or to be installed upside down, or to be set so that the mover 203 may vertically move.

According to the surface acoustic wave actuator 100 of the related art 1 explained with reference to FIGS. 1A and 1B, the slider 105 may drop off the piezoelectric board 101 if the piezoelectric board 101 is inclined or if it is installed upside down. To prevent this, the surface acoustic wave actuator 200 of the related art 2 shown in FIG. 2 employs some countermeasures. According to the related art 2, the channel-shaped magnetic yoke 203C of the mover 203 and the channel-shaped magnetic guide 204 attached to the under surface 201b of the piezoelectric board 201 produce a closed loop of magnetic flux so that the magnetic flux may hardly leak. Consequently, it is impossible to utilize the magnetic flux that is generated by and moves with the mover 203, for moving another object. The channel-shaped magnetic guide 204 is attached to the under surface 201b of the piezoelectric board 201 in the longitudinal (Y-axis) direction of the piezoelectric board 201, and therefore, the mover 203 arranged on the top surface 201a of the piezoelectric board 201 is movable only in the longitudinal (Y-axis) direction of the piezoelectric board 201. Namely, the mover 203 is unable to two-dimensionally move in X- and/or Y-axis directions. This raises a problem of limiting a range of applications of the surface acoustic wave actuator 200.

This problem will be explained. The surface acoustic wave actuator demonstrates, as mentioned above, excellent working performance such as high speed, high thrust, and high resolution. Due to this, the actuator is applicable not only to a linear motor but also to, for example, a drive source for a two-axis-wobble-type deflector that two-dimensionally wobbles in X- and/or Y-axis directions.

The two-axis-wobble-type deflector is not shown here but an example thereof is shown in Japanese Unexamined Patent Application Publication Hei-6(1994)-180428 that discloses an electrostatic power driven compact optical scanner employing electrostatic drive and in Japanese Unexamined Patent Application Publication Hei-8(1996)-32227 that discloses a planar electromagnetic actuator employing electromagnetic drive. The former employs electrostatic drive, i.e., voltage drive that involves little power consumption because substantially no current flows. The former, however, generates only small force and hardly provides large deflection angles. In addition, the former needs several hundreds of drive voltages.

On the other hand, the latter employing electromagnetic drive of Lorentz force generates large force to provide large deflection angles. In addition, the latter can control the deflection angles by controlling a current value. To maintain a fixed deflection angle, the latter must always supply a fixed current. Accordingly, power consumption will increase when keeping a fixed deflection angle for a certain extent of time.

The surface acoustic wave actuator of the related art 2 is inapplicable to the two-axis-wobble-type deflector because the mover 203 is unable to move two-dimensionally. Namely, the actuator of the related art 2 must be improved if it must conduct two-dimensional movement.

SUMMARY OF THE INVENTION

There is, therefore, a need of a surface acoustic wave actuator having a mover set on a first face of a piezoelectric board and capable of two-dimensionally moving along the first face without dropping off the piezoelectric board. Also, there is a need of a deflector that employs such a surface acoustic wave actuator and is capable of two-dimensionally wobble a deflecting face of a deflector body at reduced power consumption.

To meet these needs, a first aspect of the present invention provides a surface acoustic wave actuator having a mover arranged on a first surface of a piezoelectric board and comb-shaped electrodes formed on the first surface. High frequencies are applied to the comb-shaped electrodes to generate Rayleigh waves that move the mover.

The com-shaped electrodes include first to fourth electrodes formed on the first surface of the piezoelectric board, the first and third comb-shaped electrodes being on each side of the mover on an X-axis, the second and fourth comb-shaped electrodes being on each side of the mover on a Y-axis. The mover at least has a permanent magnet. The surface acoustic wave actuator further has a unit to selectively apply a high frequency to at least one of two electrodes one selected from the first and third comb-shaped electrodes and the other from the second and fourth comb-shaped electrodes. The surface acoustic wave actuator also has a mover holder facing the mover with the piezoelectric board interposed therebetween. The mover holder at least has a magnetic material configured to hold the mover.

According to the surface acoustic wave actuator of the first aspect, a high frequency is applied to one of the two comb-shaped electrodes arranged on the X-axis at the left and right ends of the first surface of the piezoelectric board and/or one of the two comb-shaped electrodes arranged on the Y-axis at the upper and lower ends of the first surface of the piezoelectric board, to generate Rayleigh waves that move the mover on the first surface of the piezoelectric board in the X- and/or Y-axis directions. The mover at least having the permanent magnet and the mover holder at least having the magnetic material face each other and attract each other on each side of the piezoelectric board. As a result, the mover and mover holder do not drop off the piezoelectric board even if the piezoelectric board is inclined or is installed upside down. The surface acoustic wave actuator of the first aspect is, therefore, easy to use.

A second aspect of the present invention provides a deflector employing the surface acoustic wave actuator of the first aspect. The deflector includes a deflector-body support, a deflector body supported with a first surface of the deflector-body support and configured to wobble in at least one of X- and Y-axis directions, a magnetic member arranged in a recess formed in the deflector-body support on an axis that passes through the center of a deflecting face of the deflector body and is orthogonal to the deflecting face, the magnetic member being configured to be displaced so as to wobble the deflecting face in at least one of the X- and Y-axis directions, and the surface acoustic wave actuator arranged beside a second surface of the deflector-body support that is opposite to the first surface. The magnetic member is displaced by a magnetic field that is generated in response to a movement of the permanent magnet of the mover of the surface acoustic wave actuator, to wobble the deflecting face of the deflector body.

According to the second aspect, the deflector employs the surface acoustic wave actuator of the first aspect as a drive source to two-dimensionally wobble the deflecting face of the deflector. As a result, no power is consumed to maintain the deflecting face of the deflector at a given inclination angle, and therefore, the deflector as a whole consumes little power.

The nature, principle and utility of the invention will become more apparent from the following detailed description when read in conjunction with the accompanying drawings.

BRIEF DESCRIPTION OF THE DRAWINGS

In the accompanying drawings:

FIG. 1B shows a concept of frictional drive based on Rayleigh waves;

FIGS. 6A to 6C are longitudinal sections explaining operation of the deflector of FIG. 5, in which FIG. 6A shows a deflector body in an initial state, FIG. 6B shows a mirror-like deflecting face formed in the deflector body, the deflecting face being in a state wobbled in a counterclockwise direction around a pair of second beams (X-axis), and FIG. 6C shows the mirror-like deflecting face in a state wobbled in a counterclockwise direction around a pair of first beams (Y-axis);

FIGS. 8A to 8C are longitudinal sections explaining operation of the partly-modified deflector of FIG. 7, in which FIG. 8A shows a deflector body under an initial state, FIG. 8B shows a mirror-like deflecting face formed in the deflector body, the deflecting face being in a state wobbled in a counterclockwise direction around a pair of second beams (X-axis), and FIG. 8C shows the mirror-like deflecting face in a state wobbled in a counterclockwise direction around a pair of first beams (Y-axis);

FIG. 12 is a longitudinal section explaining operation of the deflector of FIG. 11.

DETAILED DESCRIPTION OF EMBODIMENTS

Embodiments of a surface acoustic wave actuator and a deflector employing the same according to the present invention will be explained in detail item by item with reference to FIGS. 3A to 12.

<Surface Acoustic Wave Actuator>

Figure 1A:
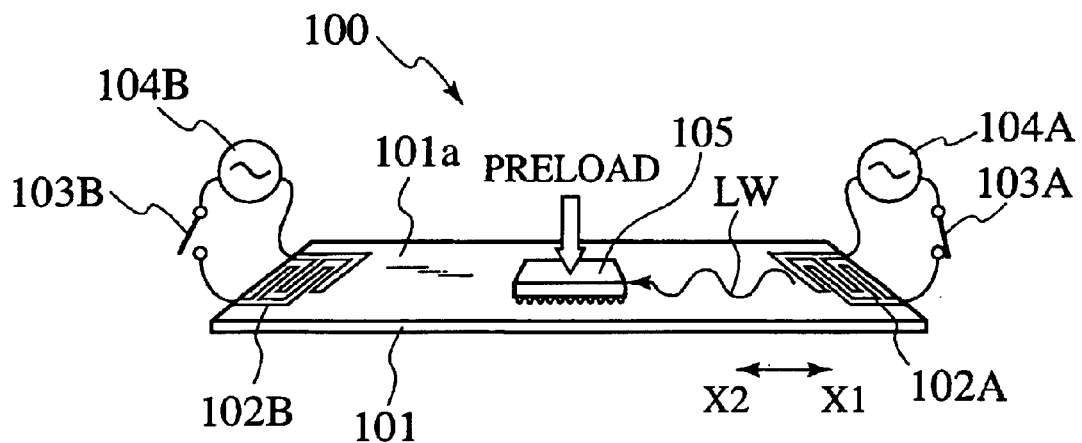
FIGS. 1A and 1B are perspective views explaining a surface acoustic wave actuator according to the related art 1, in which FIG. 1A schematically shows the structure of the surface acoustic wave actuator (motor)
Figure 1B:
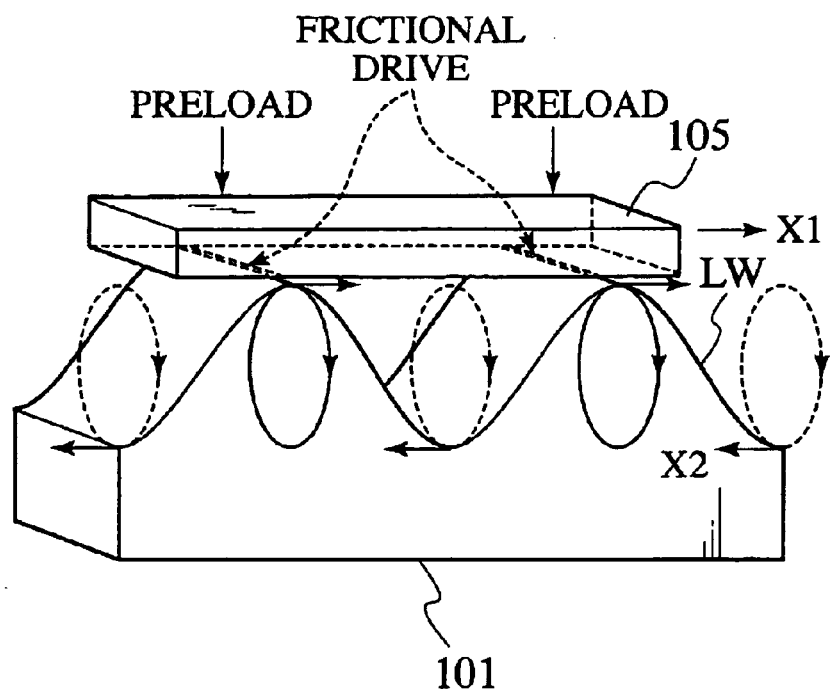
Figure 2:
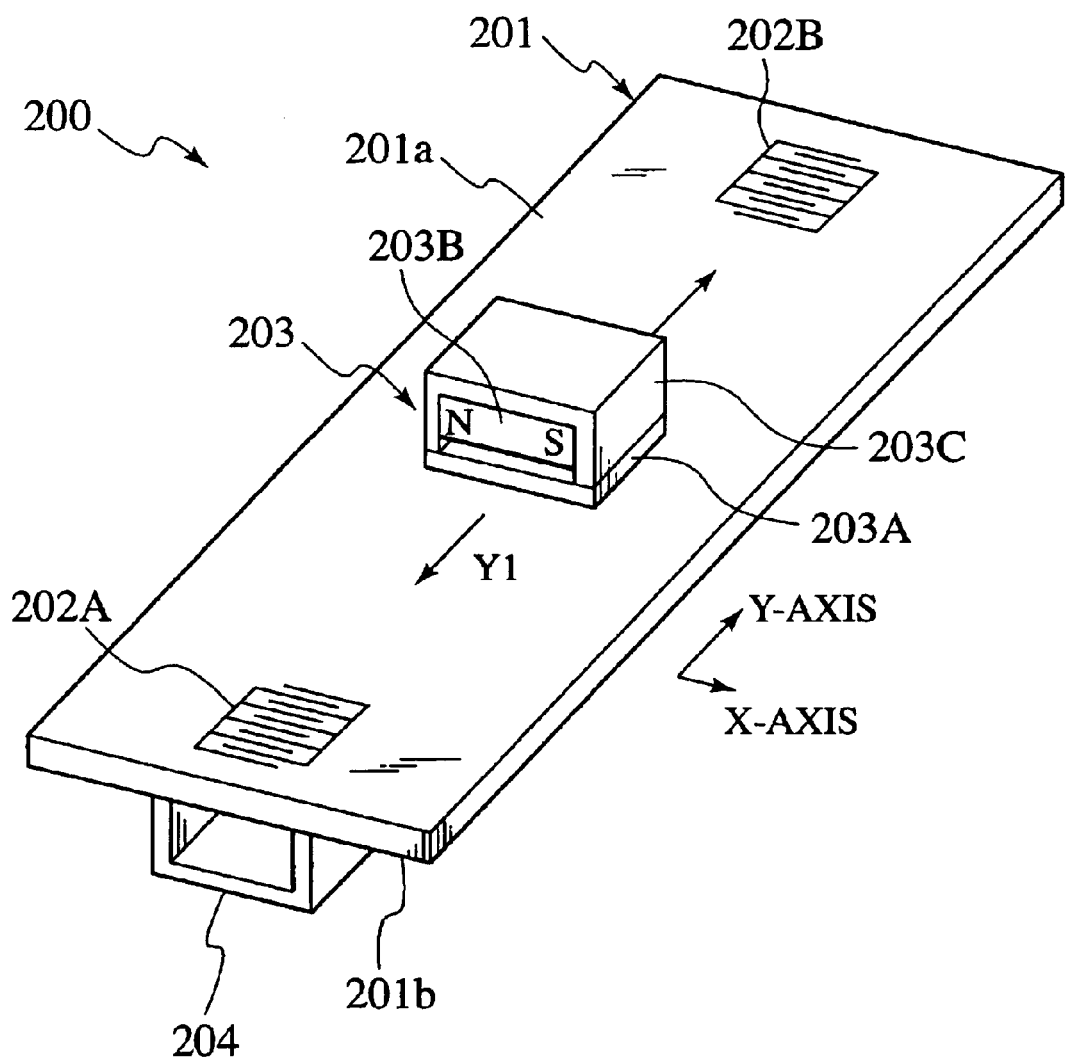
FIG. 2 is a perspective view explaining the structure of a surface acoustic wave actuator according to the related art 2.
Figure 3A:
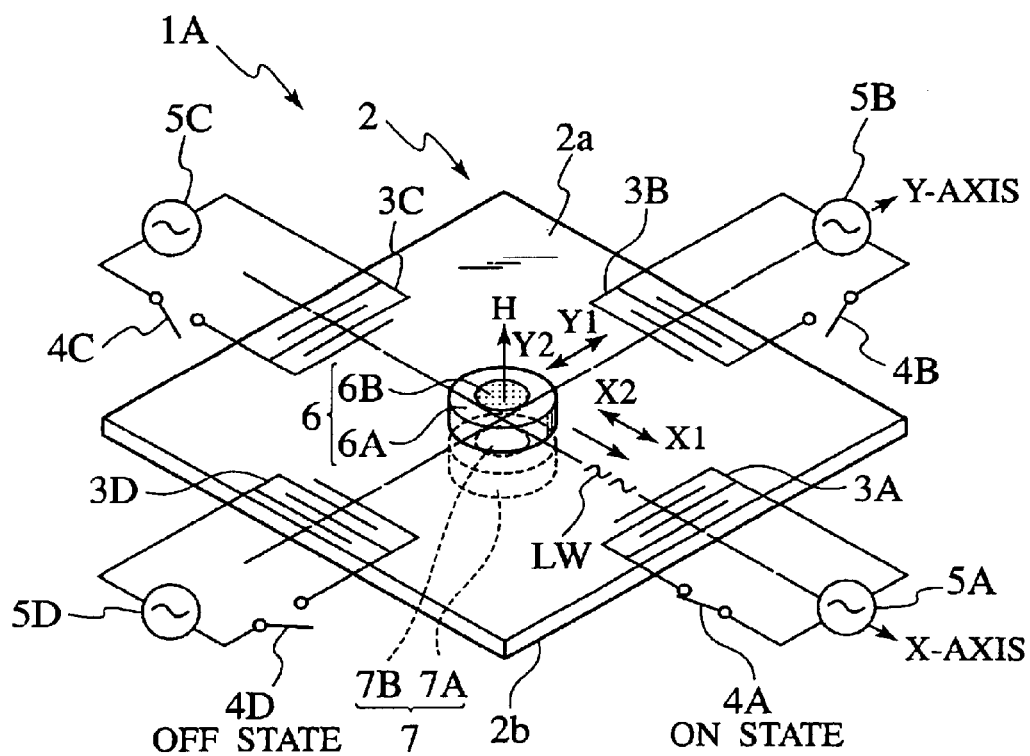
FIGS. 3A and 3B are a perspective view and a sectional view taken along an X-axis showing a surface acoustic wave actuator according to an embodiment of the present invention.
Figure 3B:
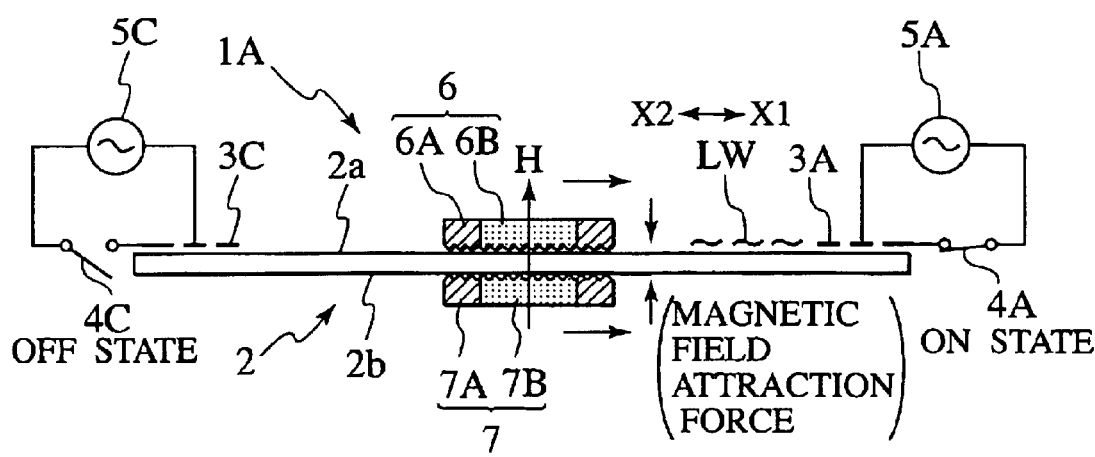

FIGS. 3A and 3B are a perspective view and a sectional view taken along an X-axis showing a surface acoustic wave actuator according to an embodiment of the present invention.

In FIGS. 3A and 3B, the surface acoustic wave actuator 1A according to an embodiment of the present invention has a piezoelectric board 2 made of, for example, lithium niobate and having a square shape. A first surface or a top surface 2a of the piezoelectric board 2 is a two-dimensional X-Y plane defined by an X-axis and a Y-axis that is orthogonal to the X-axis.

On the X-axis at right and left ends of the top surface 2a of the piezoelectric board 2, comb-shaped electrodes 3A and 3C are formed. On the Y-axis at upper and lower ends of the top surface 2a, comb-shaped electrodes 3B and 3D are formed. Namely, the first to fourth comb-shaped electrodes 3A to 3D are formed at the sides of the square top surface 2a at the intervals of 90 degrees. Each of the four comb-shaped electrodes 3A to 3D receives a high frequency from a corresponding one of high-frequency power sources 5A to 5D, as will be explained later. The high frequency converts to unidirectional Rayleigh waves LW on the piezoelectric board 2, and therefore, the electrodes 3A to 3D are sometimes called unidirectional comb-shaped electrodes.

The four comb-shaped electrodes 3A to 3D are connected to the high-frequency power sources 5A to 5D through switches 4A to 4D serving as switching units. Although the embodiment provides the four comb-shaped electrodes 3A to 3D with the four high-frequency power sources 5A to 5D, respectively, this does not limit the present invention. For example, one high-frequency power source may be provided for the electrodes on the X-axis, and another high-frequency power source for the electrodes on the Y-axis. In this case, the X-axis high-frequency power source is switched between the X-axis electrodes through a switching unit (not shown), and the Y-axis high-frequency power source is switched between the Y-axis electrodes through a switching unit (not shown).

In an inner area surrounded by the four comb-shaped electrodes 3A to 3D on the top surface 2a of the piezoelectric board 2, a mover 6 is arranged to be movable in X- and/or Y-axis directions. Namely, on the X-axis, the mover 6 is movable between the first comb-shaped electrode 3A and the third comb-shaped electrode 3C, and on the Y-axis, the mover 6 is movable between the second comb-shaped electrode 3B and the fourth comb-shaped electrode 3D.

The mover 6 consists of a slider 6A and a permanent magnet 6B that is integrally bonded to or pressed into an inner part of the slider 6A. A slide part of the mover 6 where the slider 6A and permanent magnet 6B are in contact with the top surface 2a of the piezoelectric board 2 may be roughened to promote frictional drive by Rayleigh waves LW.

The piezoelectric board 2 has a second surface or under surface 2b opposite to the first surface 2a. On the under surface 2b, a mover holder 7 is arranged. The mover holder 7 consists of a slider 7A and a magnetic material 7B that is embedded in an inner part of the slider 7A. The mover holder 7 faces the mover 6 with the piezoelectric board 2 being interposed between them and is movable together with the mover 6 along the piezoelectric board 2. A slide part of the mover holder 7 where the slider 7A and magnetic material 7B are in contact with the under surface 2b of the piezoelectric board 2 may be roughened to promote frictional drive.

The permanent magnet 6B in the mover 6 and the magnetic material 7B in the mover holder 7 are configured to vertically or horizontally align the N and S poles thereof so that a magnetic attraction force works between the permanent magnet 6B and the magnetic material 7B on each side of the piezoelectric board 2. This results in applying a preload on the mover 6 due to the magnetic attraction force and generating a leakage magnetic field H from the permanent magnet 6B of the mover 6. At this time, the magnitude of the magnetic attraction force produced by the permanent magnet 6B and magnetic material 7B is set in advance to provide a retention force that allows the mover 6 and mover holder 7 to move together relative to the piezoelectric board 2. As a result, even if the piezoelectric board 2 is inclined or is set upside down, the mover 6 and mover holder 7 will not drop off the piezoelectric board 2, to thereby provide the surface acoustic wave actuator 1A with easiness of use. The leakage magnetic field H produced by the permanent magnet 6B in the mover 6 may be oriented upwardly.

According to this embodiment, the mover 6 consists of the slider 6A and the embedded permanent magnet 6B, and the mover holder 7 of the slider 7A and the embedded magnetic material 7B. This does not limit the present invention. Instead of embedding the permanent magnet 6B and magnetic material 7B in the sliders 6A and 7A, only the permanent magnet 6B and magnetic material 7B may serve as the mover 6 and mover holder 7, respectively.

When the surface acoustic wave actuator 1A is in an initial state, the mover 6 on the top surface 2a of the piezoelectric board 2 is between the four comb-shaped electrodes 3A to 3D at the intersection between the orthogonal X- and Y-axes. At this time, the mover 6 and mover holder 7 on each side of the piezoelectric board 2 attract each other and are stopped.

If, for example, the switch 4A at the right end on the X-axis is turned on, a high frequency is supplied from the high-frequency power source 5A to the comb-shaped electrode 3A. The high frequency converts to unidirectional Rayleigh waves LW, which propagate in the direction of an arrow mark X2 on the piezoelectric board 2. The Rayleigh waves LW linearly move both the mover 6 and mover holder 7 substantially along the X-axis in the direction of an arrow mark X1. If the switch 4C at the left end on the X-axis is turned on to drive the high-frequency power source 5C, the mover 6 and mover holder 7 move linearly and substantially along the X-axis in the direction X2.

If the high-frequency power source 5B at the upper part on the Y-axis is activated, the mover 6- and mover holder 7 together move linearly and substantially along the Y-axis in the direction of an arrow mark Y1. If the high-frequency power source 5D at the lower end on the Y-axis is activated, the mover 6 and mover holder 7 together move linearly and substantially along the Y-axis in the direction of an arrow mark Y2.

If the switch 4A at the right end on the X-axis and the switch 4B at the upper end on the Y-axis are substantially simultaneously turned on to substantially simultaneously apply high frequencies from the high-frequency power sources 5A and 5B to the comb-shaped electrodes 3A and 3B, Rayleigh waves in the directions X2 and Y2 move both the mover 6 and mover holder 7 in the direction of a composite vector of the directions X1 and Y1. Namely, the mover 6 and mover holder 7 can two-dimensionally move in the first quadrant of the X-Y plane. By adjusting the high frequencies from the high-frequency power sources 5A and 5B, a moving direction of the mover 6 and mover holder 7 in the first quadrant on the X-Y plane is adjustable.

Further, the mover 6 and mover holder 7 can two-dimensionally move in the second quadrant of the X-Y plane with a combination of the comb-shaped electrodes 3B and 3C, in the third quadrant of the X-Y plane with a combination of the comb-shaped electrodes 3C and 3D, and in the fourth quadrant of the X-Y plane with a combination of the comb-shaped electrodes 3D and 3A.

According to the surface acoustic wave actuator 1A of the embodiment having the above-mentioned configuration, one of the two comb-shaped electrodes (3A, 3C) arranged at left and right ends on the X-axis and/or one of the two comb-shaped electrodes (3B, 3D) arranged at upper and lower ends on the Y-axis receive high frequencies to generate Rayleigh waves LW to simultaneously two-dimensionally move the mover 6 at least having the permanent magnet 6B and the mover holder 7 at least having the magnetic material 7B with the piezoelectric board 2 being interposed between the mover 6 and the mover holder 7. This arrangement can suppress power consumption of the high-frequency power sources 5A to 5D serving as drive sources for the mover 6.

According to the embodiment, the mover holder 7 is provided with the magnetic material 7B. Like in the mover 6, the magnetic material 7B may be a permanent magnet. In this case, the mover 6 and mover holder 7 are arranged to align their magnetic poles so as to attract each other. This results in applying a stronger preload to the mover 6 and generating a stronger outward leakage magnetic field H.

Further, according to the embodiment, not only on the top surface 2a, other four comb-shaped electrodes 3A to 3D may be provided on the under surface 2b, and accordingly the high frequencies are simultaneously applied to the comb-shaped electrodes on both the top and under surfaces 2a and 2b to adjust the movement of the mover 6 and mover holder 7.

A modification of the surface acoustic wave actuator 1A according to the present invention will be explained with reference to FIGS. 4A and 4B.

Figure 4A:
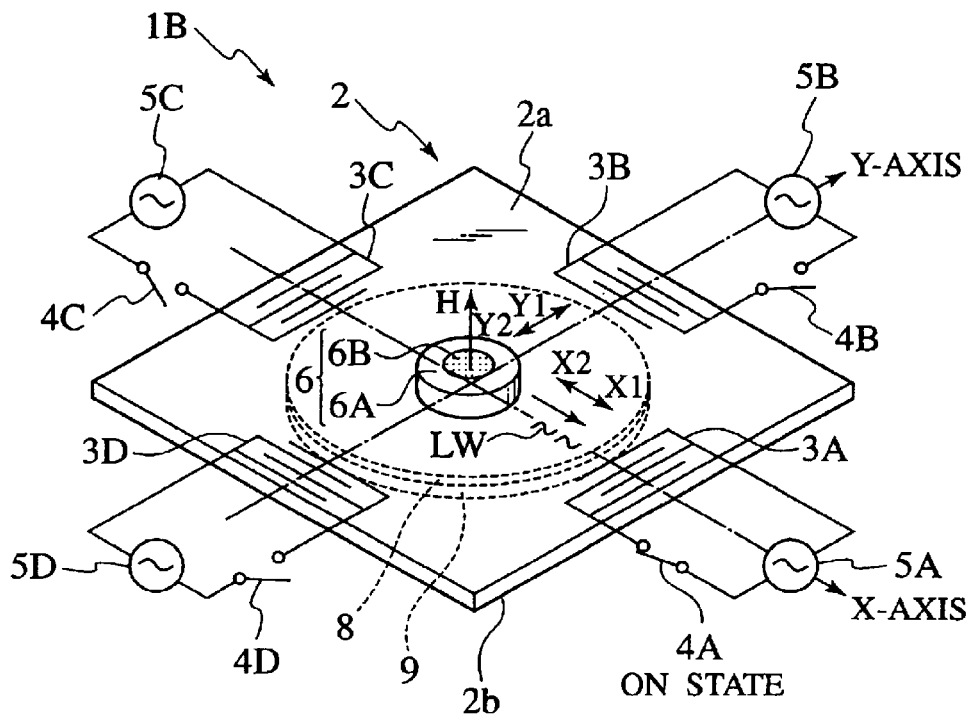
FIGS. 4A and 4B are a perspective view and a sectional view taken along an X-axis showing a surface acoustic wave actuator according to a modification of the above-embodiment.
Figure 4B:
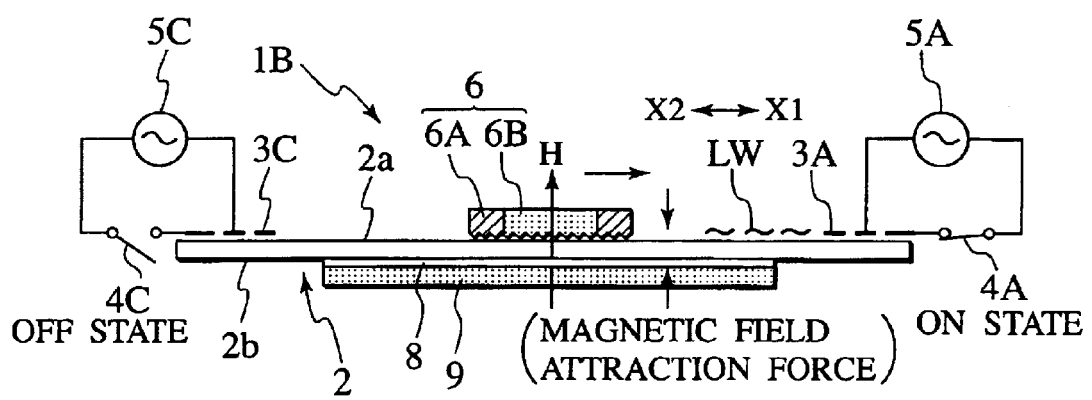

FIGS. 4A and 4B are a perspective view and a sectional view taken along an X-axis showing the modified surface acoustic wave actuator according to the present invention.

Parts of the surface acoustic wave actuator 1B shown in FIGS. 4A and 4B that are the same as those of the surface acoustic wave actuator 1A explained with reference to FIGS. 3A and 3B are depicted with the same reference numerals, and parts of the actuator 1B that are different from those of the actuator 1A are represented with new reference numerals. The following explanation will be simplified to mainly focus on such different parts.

In FIGS. 4A and 4B, the modified surface acoustic wave actuator 1B has a piezoelectric board 2 with a top surface 2a. Arrangements on the top surface 2a are completely the same as those of the above-mentioned surface acoustic wave actuator 1A. What is different from the surface acoustic wave actuator 1A is that an under surface 2b of the piezoelectric board 2 is provided with a mover holder 9 bonded to the under surface 2b with an adhesive 8. The mover holder 9 consists of a magnetic plate having a large area. The area of the mover holder (hereinafter referred to as magnetic plate) 9 is designed to cover a moving range of a mover 6 placed on the top surface 2a of the piezoelectric board 2.

A permanent magnet 6B in the mover 6 and the magnetic plate 9 are arranged such that N and S poles thereof are vertically or horizontally aligned to produce a magnetic field attraction force on each side of the piezoelectric board 2. Such magnetic field attraction force applies a preload on the mover 6 and makes the permanent magnet 6B in the mover 6 generate a leakage magnetic field H. At this time, the magnetic field attraction force by the permanent magnet 6B and magnetic plate 9 is predetermined so that the mover 6 may move relative to and be held by the piezoelectric board 2. Even if the piezoelectric board 2 is inclined or is installed upside down, the mover 6 will never drop off the piezoelectric board 2. This improves the usability of the surface acoustic wave actuator 1B. The leakage magnetic field H from the permanent magnet 6B may be oriented upwardly.

According to the modified surface acoustic wave actuator 1B, the second permanent magnet (mover holder) 9 bonded to the under surface 2b of the piezoelectric board 2 has a large area and is fixed to the under surface 2b. Due to this, only the mover 6 moves on the top surface 2a of the piezoelectric board 2. This reduces driving load and helps reduce the sizes of high-frequency power sources 5A to 5D smaller than those of the surface acoustic wave actuator 1A.

In this modification, the magnetic plate 9 may be a permanent magnet. In this case, the permanent magnet 6B of the mover 6 and the permanent magnet serving as the magnetic plate 9 may vertically be magnetized so that the mover 6 and magnetic plate 9 attract each other on each side of the piezoelectric board 2. This applies a stronger preload on the mover 6 and generates a stronger outward leakage magnetic field H.

<Deflector Employing Surface Acoustic Wave Actuator>

An example of a deflector employing the surface acoustic wave actuator according to the present invention will be explained with reference to FIGS. 5 and 6A to 6C.

Figure 5:
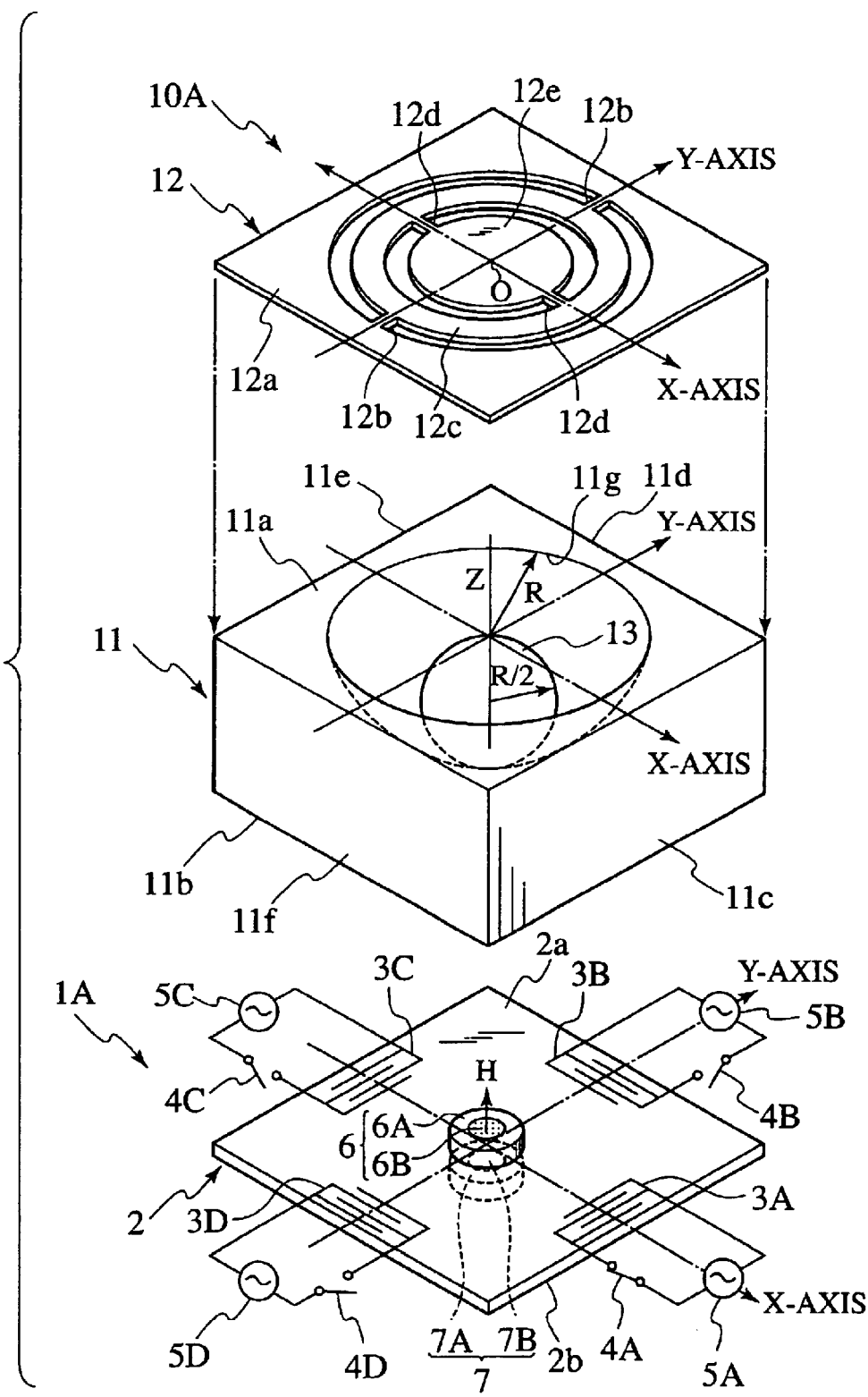
FIG. 5 is an exploded perspective view explaining an example of a deflector employing the surface acoustic wave actuator according to the present invention.
Figure 6A:
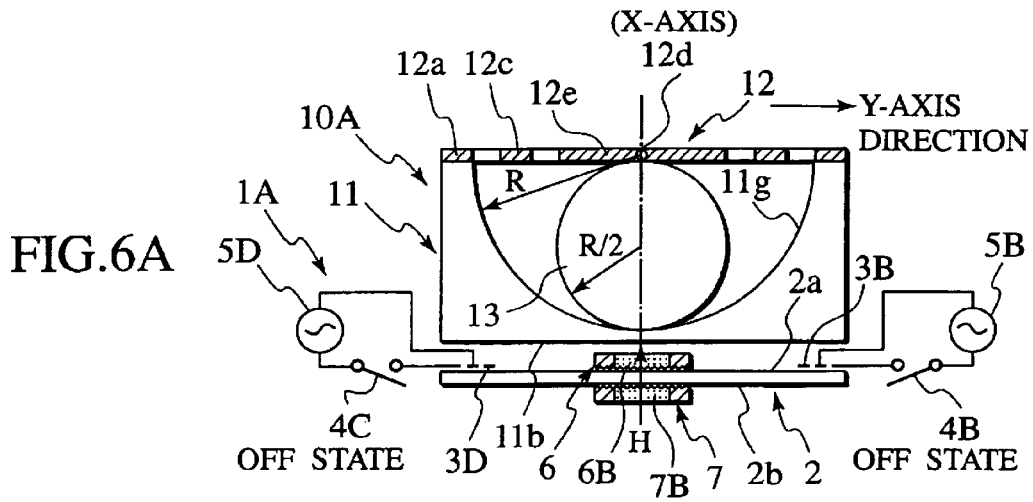
Figure 6B:
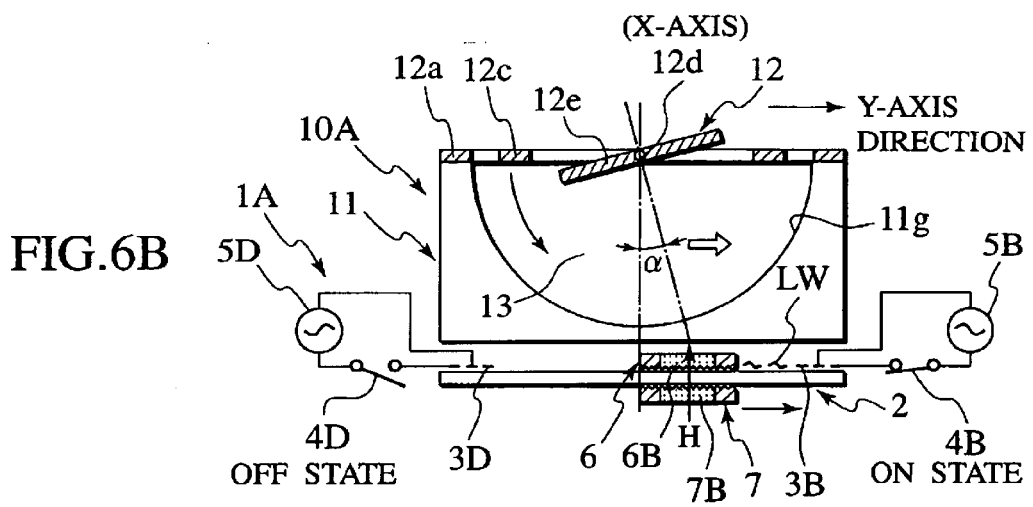
Figure 6C:
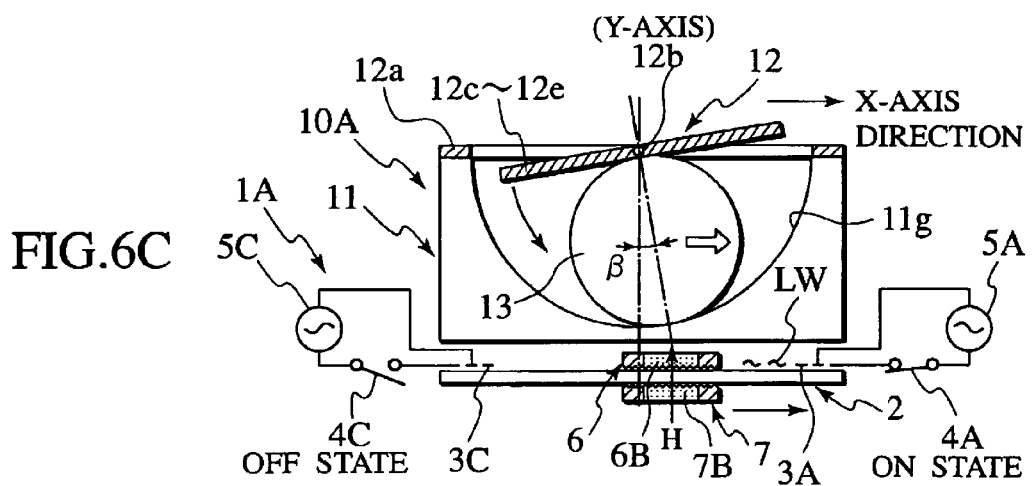

FIG. 5 is an exploded perspective view showing the deflector employing the surface acoustic wave actuator according to the present invention. FIGS. 6A to 6C are longitudinal sections explaining operation of the deflector shown in FIG. 5, in which FIG. 6A shows a deflector body in an initial state, FIG. 6B shows a mirror-like deflecting face formed in the deflector body, the deflecting face being in a state wobbled in a counterclockwise direction around a pair of second beams (X-axis), and FIG. 6C shows the mirror-like deflecting face in a state wobbled in a counterclockwise direction around a pair of first beams (Y-axis).

In FIG. 5, the deflector employing the surface acoustic wave actuator 1A according to the present invention has a deflector-body support 11 serving as a base. The deflector-body support 11 has a top surface 11a and an under surface 11b that is opposite to the top surface 11a. The top and bottom surfaces 11a and 11b have each a square shape. A space between the top surface 11a and the under surface 11b is surrounded with side faces 11c to 11f, to define the rectangular parallelepiped deflector-body support 11. A semispherical bottomed recess 11g having a radius R from the center of the top surface 11a is opened in the deflector-body support 11 from the top surface 11a.

The top surface 11a of the deflector-body support 11 supports a deflector body 12 made of, for example, a thin silicon, polyimide, or stainless material. The deflector body 12 has a square shape, and the external dimensions thereof are substantially equal to those of the top surface 11a of the deflector-body support 11.

For the sake of explanation, the center of the top surface 11a of the deflector-body support 11 and the center of the deflector body 12 are each at the intersection between X- and Y-axes of a two-axis coordinate system.

The deflector body 12 mentioned above has an outer frame 12a, a pair of first beams 12b, an inner frame 12c, a pair of second beams 12d, and a mirror-like deflecting face 12e. These components are integral with each other.

More precisely, in the deflector body 12, the pair of first beams 12b inwardly extend from the outer frame 12a toward each other along the Y-axis. Between the first beams 12b, the annular inner frame 12c is formed to wobble around the first beams 12b (Y-axis) in X-axis directions. The pair of second beams 12d are orthogonal to the first beams 12b and inwardly extend from the annular inner frame 12c along the X-axis. Between the second beams 12d, the mirror-like deflecting face 12e is supported. The mirror-like deflecting face 12e has a disk shape and is mirror-finished. The mirror-like deflecting face 12e can wobble around the second beams 12d (X-axis) in Y-axis directions. The mirror-like deflecting face 12e of the deflector body 12 is positioned beside the top surface 11a that is one of the faces of the deflector-body support 11.

The pair of first beams 12b and the pair of second beams 12d formed in the deflector body 12 have torsional resilient characteristics and structures. Spaces between the outer frame 12a and the inner frame 12c of the deflector body 12 are blanked out by, for example, etching except the pair of first beams 12b that connect the outer frame 12a and the inner frame 12c to each other. Similarly, spaces between the inner frame 12c and the mirror-like deflecting face 12e are blanked out by, for example, etching except the pair of second beams 12d that connect the inner frame 12c and the mirror-like deflecting face 12e to each other.

The semispherical bottomed recess 11g formed in the deflector-body support 11 accommodates a rotatable spherical magnetic member 13. The spherical magnetic member 13 has a radius of R/2 relative to the radius R of the semispherical bottomed recess 11g of the deflector-body support 11. The center of the spherical magnetic member 13 is on a Z-axis that passes through the center O of the mirror-like deflecting face 12e of the deflector body 12 and orthogonally crosses the mirror-like deflecting face 12e. The spherical magnetic member 13 faces the under surface 11b of the deflector-body support 11.

When an under surface of the outer frame 12a of the deflector body 12 is attached to the top surface 11a of the deflector-body support 11, the spherical magnetic member 13 is held and received between the center of an under surface of the mirror-like deflecting face 12e formed in the deflector body 12 and an inner circumferential surface of the semispherical bottomed recess 11g formed in the deflector-body support 11. As a result, the spherical magnetic member 13 is in point-contact with the center of the under surface of the mirror-like deflecting face 12e and is also in point-contact with the inner circumferential surface of the semispherical bottomed recess 11g. As will be explained later in connection with operation of the deflector, the spherical magnetic member 13 is displaced along the semispherical bottomed recess 11g of the deflector-body support 11 so as to wobble the mirror-like deflecting face 12e of the deflector body 12 in the X- and/or Y-axis directions.

Beside the under surface 11b of the deflector-body support 11, the surface acoustic wave actuator 1A explained with reference to FIGS. 3A and 3B is arranged. Here; the under surface 11b of the deflector-body support 11 faces the top surface 2a of the piezoelectric board 2, and the mover 6 set on the top surface 2a of the piezoelectric board 2 is close to the spherical magnetic member 13 arranged in the semispherical bottomed recess 11g. Since the components of the surface acoustic wave actuator 1A have already been explained, they are represented with the same reference numerals in FIGS. 5 and 6A to 6C and are not explained in detail.

In the vicinity of the under surface 11b of the deflector-body support 11, the modified surface acoustic wave actuator 1B explained with reference to FIGS. 4A and 4B may be arranged instead of the actuator 1A.

Operation of the deflector 10A employing the surface acoustic wave actuator 1A according to the present invention will be explained with reference to FIGS. 6A to 6C.

In FIG. 6A, the deflector 10A is in an initial state when the under surface of the outer frame 12a of the deflector body 12 is attached to the deflector-body support 11. At this time, the pair of first beams 12b (FIG. 5) and the pair of second beams 12d provide a restoring force by torsional resiliency to make the inner frame 12c and mirror-like deflecting face 12e maintain substantially horizontal postures on the deflector-body support 11. In the initial state, the switches 4B and 4D are OFF, and therefore, the comb-shaped electrodes 3B and 3D arranged on the Y-axis in the surface acoustic wave actuator 1A beside the under surface 11b of the deflector-body support 11 receive no high frequencies from the high-frequency power sources 5B and 5D. Also, the switches 4A and 4C are OFF, and therefore, the comb-shaped electrodes 3A and 3C (not shown) arranged on the X-axis receive no high frequencies from the high-frequency power sources 5A and 5C. Between the center of the under surface of the mirror-like deflecting face 12e of the deflector body 12 and the inner circumferential surface of the semispherical bottomed recess 11g of the deflector-body support 11, there is the spherical magnetic member 13 having a half radius (R/2) of the radius R of the spherical bottomed recess 11g. Accordingly, the spherical magnetic member 13 is in point-contact with the center of the under surface of the mirror-like deflecting face 12e and with the center of the inner circumferential surface of the semispherical bottomed recess 11g just below. Since there are no high frequencies applied to the comb-shaped electrodes 3A to 3D, the mover 6 set on the top surface 2a of the piezoelectric board 2 and the mover holder 7 set on the under surface 2b of the piezoelectric board 2 are both stopped at the center of the piezoelectric board 2 on each side of the piezoelectric board 2. At this time, the permanent magnet 6B in the mover 6 and the magnetic material 7B in the mover holder 7 attract each other on each side of the piezoelectric board 2. At the same time, an upward leakage magnetic field H from the permanent magnet 6B in the mover 6 attracts the spherical magnetic member 13 and stops the same at the center position on the semispherical bottomed recess 11g.

In FIG. 6B, only the mirror-like deflecting face 12e formed in the deflector body 12 is wobbled around the pair of second beams 12d (X-axis) from the initial state to the counterclockwise direction. To achieve this, the switch 4B at the right side on the Y-axis in the surface acoustic wave actuator 1A is turned on to apply a high frequency from the high-frequency power source 5B to the comb-shaped electrode 3B, while the switch 4D at the left side on the Y-axis is kept OFF. The high frequency applied only to the comb-shaped electrode 3B generates Rayleigh waves LW that advance toward the mover 6 set on the piezoelectric board 2, to move the mover 6 rightward substantially along the Y-axis. At this time, the permanent magnet 6B in the mover 6 and the magnetic material 7B in the mover holder 7 attract each other on each side of the piezoelectric board 2 and together move rightward. The upward leakage magnetic field H from the permanent magnet 6B in the mover 6 attracts and moves the spherical magnetic member 13 in the direction of an arrow mark along the inner circumferential surface of the semispherical bottomed recess 11g. According to the movement of the spherical magnetic member 13 in the arrow direction, the spherical magnetic member 13 gets in point-contact with the center of the under surface of the mirror-like deflecting face 12e of the deflector body 12 and with a point that is displaced by R·tan a in an oblique upper right direction from the just-below center of the semispherical bottomed recess 11g. As a result, only the mirror-like deflecting face 12e wobbles in the counterclockwise direction around the pair of second beams 12d (X-axis) by an angle a. When the application of high frequency to the comb-shaped electrode 3B is stopped, the mover 6 stops at the position, and the leakage magnetic field H from the permanent magnet 6B in the mover 6 holds the spherical magnetic member 13 at the attracted position. Consequently, the mirror-like deflecting face 12e of the deflector body 12 can be held at a given angle without supplying power thereto.

To wobble only the mirror-like deflecting face 12e formed in the deflector body 12 around the pair of second beams 12d (X-axis) from the initial state to the clockwise direction, the switch 4D at the left side on the Y-axis is turned on, contrary to the above-mentioned case, to supply a high frequency from the high-frequency power source 5D to the comb-shaped electrode 3D.

In FIG. 6C, the inner frame 12c formed in the deflector body 12, the pair of second beams 12d, and the mirror-like deflecting face 12e are wobbled around the pair of first beams 12b (Y-axis) from the initial state to the counterclockwise direction. To achieve this, the switch 4A at the right side on the X-axis in the surface acoustic wave actuator 1A is turned on to apply a high frequency from the high-frequency power source 5A to the comb-shaped electrode 3A. At this time, the switch 4C at the left side on the X-axis is kept OFF. The high frequency applied only to the comb-shaped electrode 3A generates Rayleigh waves LW that advance toward the mover 6 set on the piezoelectric board 2 and move the mover 6 rightward substantially along the X-axis. At this time, the permanent magnet 6B in the mover 6 and the magnetic material 7B in the mover holder 7 attract each other on each side of the piezoelectric board 2 and together move rightward. An upward leakage magnetic field H from the permanent magnet 6B in the mover 6 attracts and moves the spherical magnetic member 13 in the direction of an arrow mark along the inner circumferential surface of the semispherical bottomed recess 11g of the deflector-body support 11. According to the movement of the spherical magnetic member 13 in the arrow direction, the spherical magnetic member 13 gets in point-contact with the center of the under surface of the mirror-like deflecting face 12e of the deflector body 12 and with a point that is displaced by R·tan β in an oblique upper right direction from the just-below center of the semispherical bottomed recess 11g. As a result, the inner frame 12c, the pair of second beams 12d, and the mirror-like deflecting face 12e together wobble around the pair of first beams 12b (Y-axis) in the counterclockwise direction by an angle β. When the application of high frequency to the comb-shaped electrode 3A is stopped, the mover 6 stops at the position, and the leakage magnetic field H from the permanent magnet 6B in the mover 6 holds the spherical magnetic member 13 at the attracted position. Accordingly, the mirror-like deflecting face 12e formed in the deflector body 12 can be held at a given angle without supplying power.

To wobble the inner frame 12c of the deflector body 12, the pair of second beams 12d, and the mirror-like deflecting face 12e around the pair of first beams 12b (Y-axis) from the initial state to the clockwise direction, the switch 4C is turned on, on the contrary to the above, to apply a high frequency from the high-frequency power source 5C to the comb-shaped electrode 3C.

In the above, the operation of FIG. 6B and the operation of FIG. 6C have separately been explained. One of the comb-shaped electrodes 3A and 3C formed at the left and right ends on the X-axis in the surface acoustic wave actuator 1A (or 1B of FIGS. 4A and 4B) and one of the comb-shaped electrodes 3B and 3D formed at the upper and lower ends on the Y-axis may selectively be combined to apply high frequencies thereto. Then, it is possible to two-dimensionally move the mover 6 at least having the permanent magnet 6B along the piezoelectric board 2. In this case, the spherical magnetic member 13 attracted by the mover 6 also two-dimensionally moves along the inner circumferential surface of the semispherical bottomed recess 11g of the deflector-body support 11. This results in two-dimensionally wobbling, on the X-Y plane, the mirror-like deflecting face 12e that is in contact with the spherical magnetic member 13. By stopping the movement of the mover 6, it is possible to maintain an inclined position of the mirror-like deflecting face 12e in the deflector body 12. Namely, an angular position of the mirror-like deflecting face 12e can be maintained without consuming power. This reduces power consumption during the use of the deflector. For example, a laser beam may be emitted to the mirror-like deflecting face 12e formed in the deflector body 12. The laser beam can two-dimensionally be reflected in response to an inclining direction of the mirror-like deflecting face 12e.

Next, a partly modified example of the deflector 10A employing the surface acoustic wave actuator 1A according to the present invention will be explained with reference to FIGS. 7 and 8A to 8C.

Figure 7:
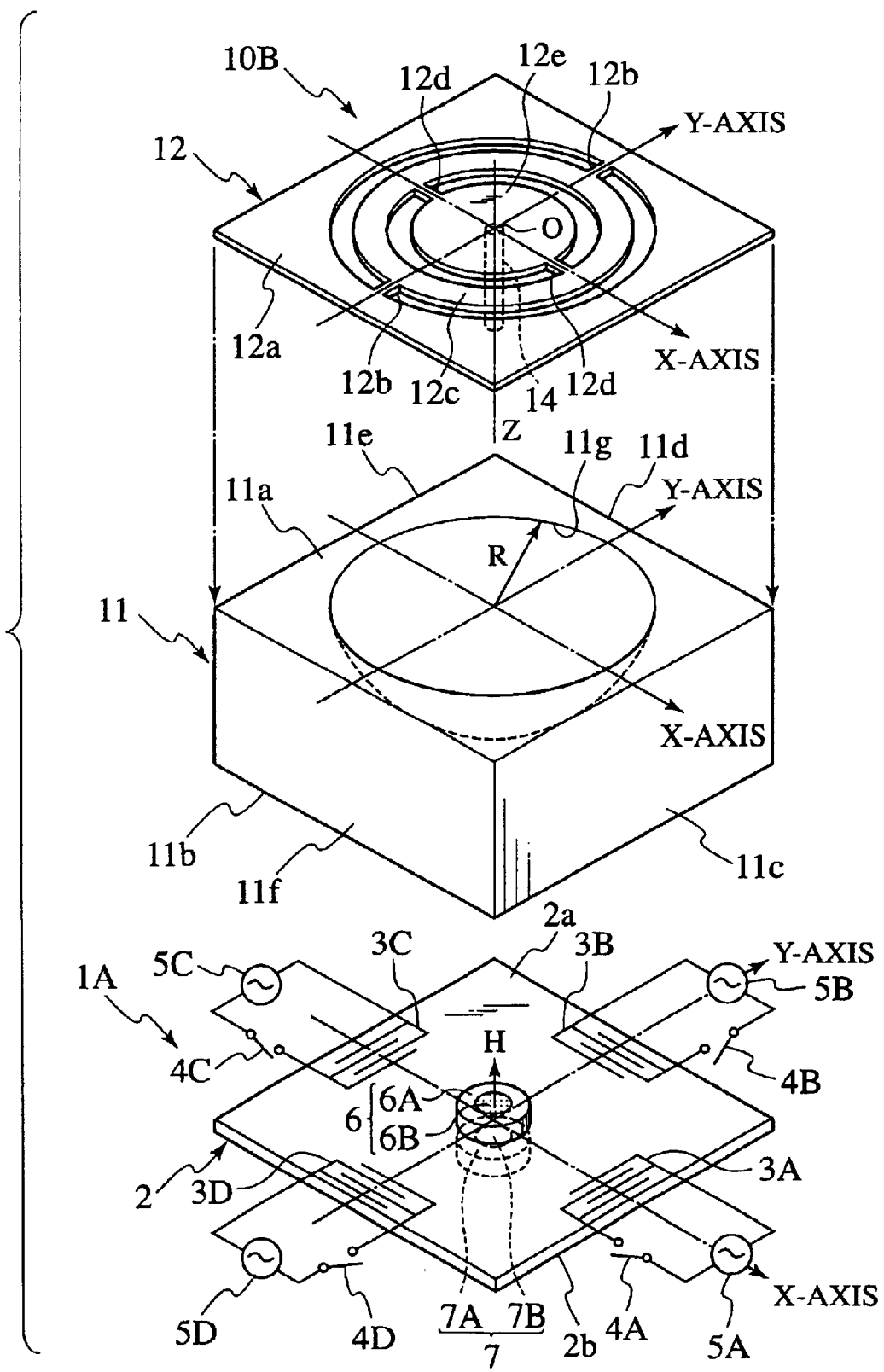
FIG. 7 is an exploded perspective view explaining the structure of a partly-modified deflector employing the surface acoustic wave actuator according to the present invention.
Figure 8A:
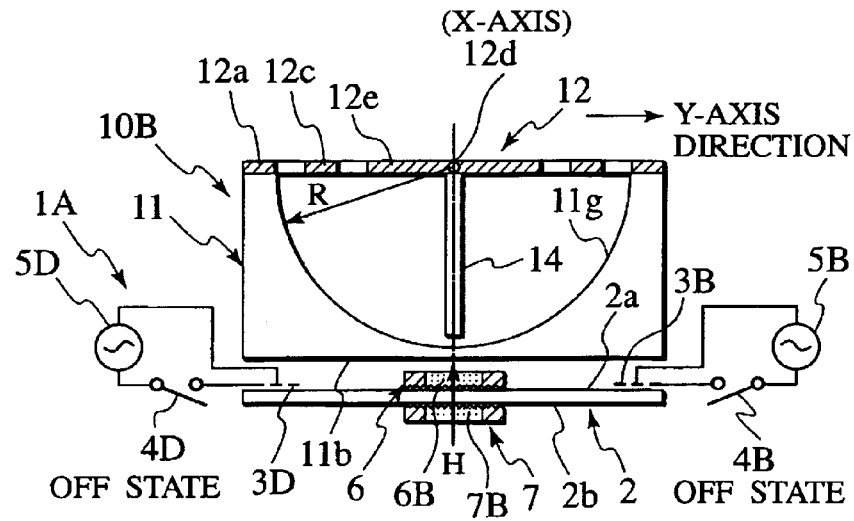
Figure 8B:
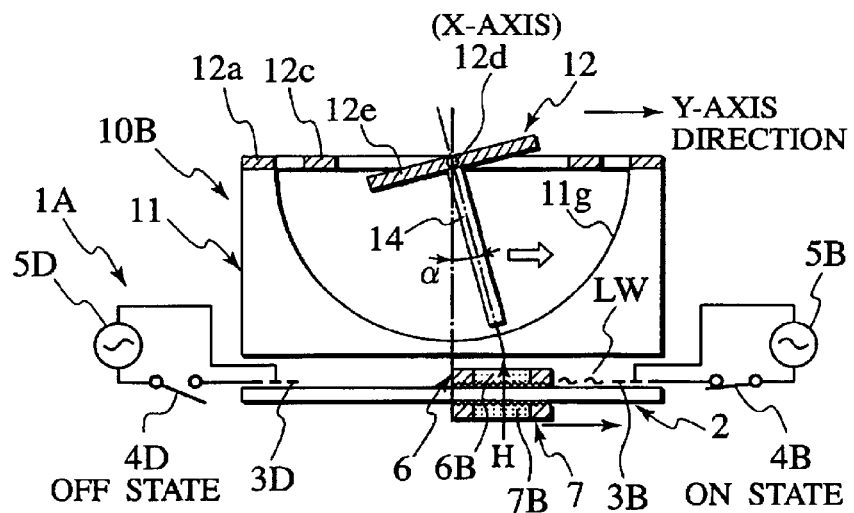
Figure 8C:
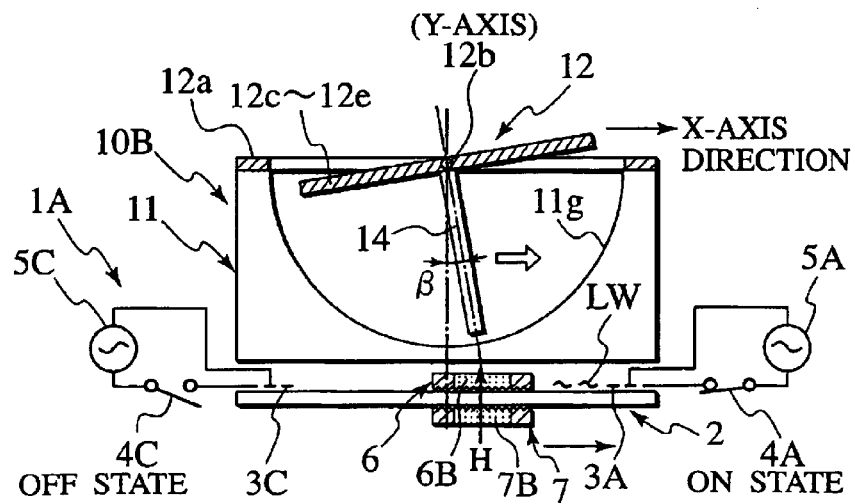

FIG. 7 is an exploded perspective view explaining the structure of a deflector that is a modification of the deflector employing the surface acoustic wave actuator according to the present invention. FIGS. 8A to 8C are longitudinal sections explaining operation of the modified deflector of FIG. 7, in which FIG. 8A shows a deflector body under an initial state, FIG. 8B shows a mirror-like deflecting face formed in the deflector body, the deflecting face being in a state wobbled in a counterclockwise direction around a pair of second beams (X-axis), and FIG. 8C shows the mirror-like deflecting face in a state wobbled in a counterclockwise direction around a pair of first beams (Y-axis).

Parts of the modified deflector 10B shown in FIGS. 7 and 8A to 8C that are the same as those of the deflector 10A explained with reference to FIGS. 5 and 6A to 6C are represented with the same reference numerals. Other different parts are represented with new reference numerals, and the following explanation will be simplified by mainly focusing on such different parts.

In the modified deflector 10B shown in FIG. 7, a deflector-body support 11 serving as a base, a deflector body 12 supported on a top surface 11a of the deflector-body support 11, and a surface acoustic wave actuator 1A arranged close to an under surface 11b of the deflector-body support 11 are completely the same as those of the deflector 10A explained with reference to FIG. 5. What is different from the deflector 10A is that the center of an under surface of a mirror-like deflecting face 12e of the deflector body 12 is fixed to an end of a bar-like magnetic material 14 and that the other end of the bar-like magnetic material 14 is inserted into a semispherical bottomed recess 11g of the deflector-body support 11.

The bar-like magnetic material 14 is slightly shorter than a radius R of the semispherical bottomed recess 11g of the deflector body 11. The bar-like magnetic material 14 is on a Z-axis that passes through the center O of the mirror-like deflecting face 12e of the deflector body 12 and orthogonally crosses the mirror-like deflecting face 12e. The bar-like magnetic material 14 is oriented to the under surface 11b of the deflector-body support 11. As will be explained later in connection with operation of the deflector, the bar-like magnetic material 14 is displaced in the semispherical bottomed recess 11g of the deflector-body support 11 so as to wobble the mirror-like deflecting face 12e of the deflector body 12 in X- and/or Y-axis directions.

According to the modified deflector 10B, it is possible to arrange, beside the under surface 11b of the deflector-body support 11, the modified surface acoustic wave actuator 1B explained with reference to FIGS. 4A and 4B instead of the actuator 1A.

Operation of the modified deflector 10B is shown in FIGS. 8A to 8C. The operation of the modified deflector 10B will be understood from the explanation for the deflector 10A conducted with reference to FIGS. 6A to 6C by replacing the spherical magnetic member 13 of the deflector 10A with the bar-like magnetic material 14.

In the surface acoustic wave actuator 1A (or 1B of FIGS. 4A and 4B), one of the comb-shaped electrodes 3A and 3C arranged at the left and right ends on the X-axis and one of the comb-shaped electrodes 3B and 3D arranged at the upper and lower ends on the Y-axis are selectively combined, and high frequencies are applied to them to two-dimensionally move the mover 6 along the piezoelectric board 2. Then, the bar-like magnetic material 14 attracted by a leakage magnetic field H from the permanent magnet 6B in the mover 6 two-dimensionally moves according to the movement of the mover 6 along the inner circumferential surface of the semispherical bottomed recess 11g of the deflector-body support 11. Consequently, the mirror-like deflecting face 12e having one side fixed to the bar-like magnetic material 14 is two-dimensionally wobbled in an X-Y plane. This operation shown in FIGS. 8A to 8C corresponds to that shown in FIGS. 6A to 6C, and therefore, the details thereof will not be explained again.

In this way, the modified deflector 10B provides effects similar to those provided by the deflector 10A explained above.

Another example of a deflector employing the surface acoustic wave actuator according to the present invention will be explained with reference to FIGS. 9 to 12.

Figure 9:
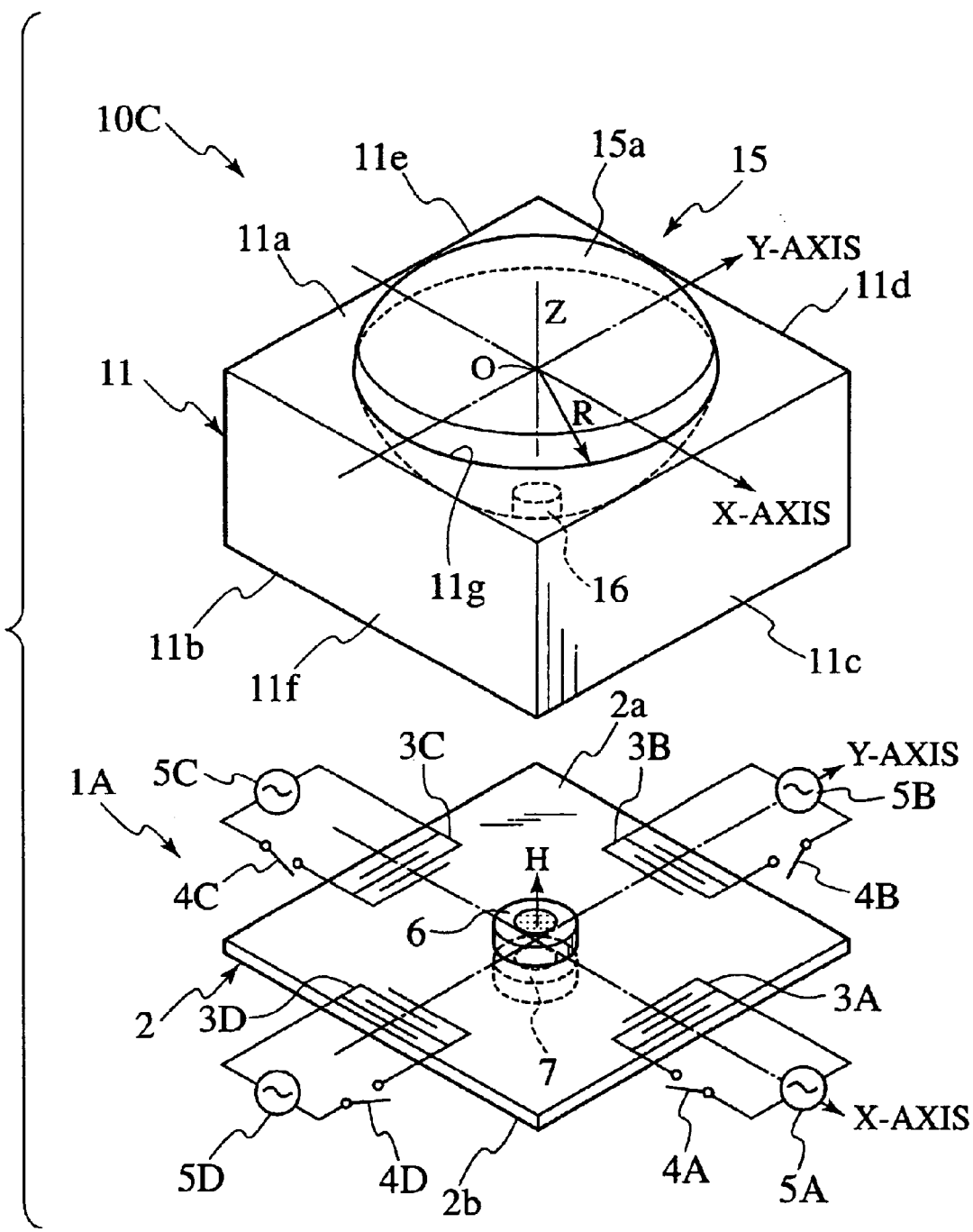
FIG. 9 is an exploded perspective view explaining another example of a deflector employing the surface acoustic wave actuator according to the present invention.
Figure 10:
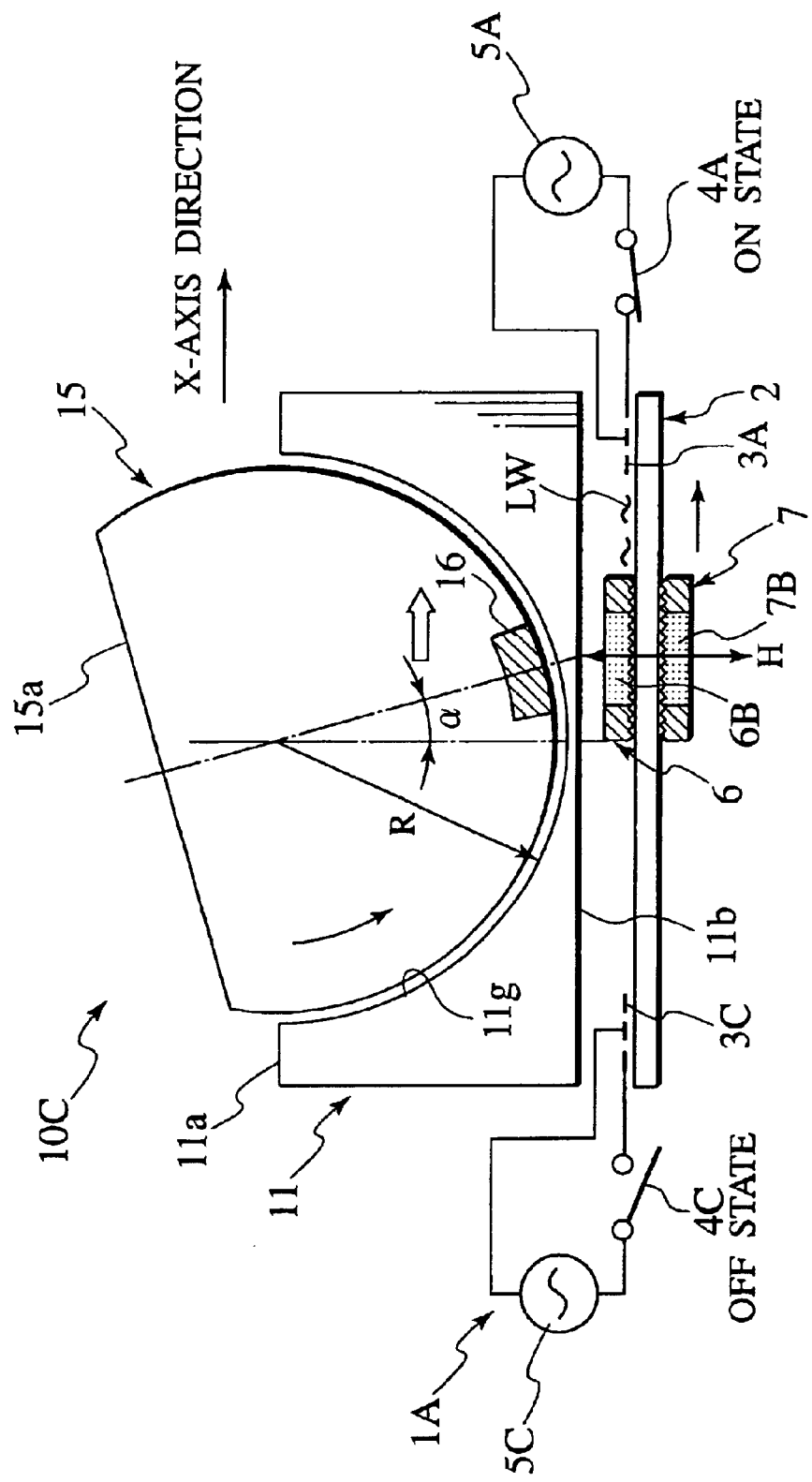
FIG. 10 is a longitudinal section explaining operation of the deflector of FIG. 9.
Figure 11:
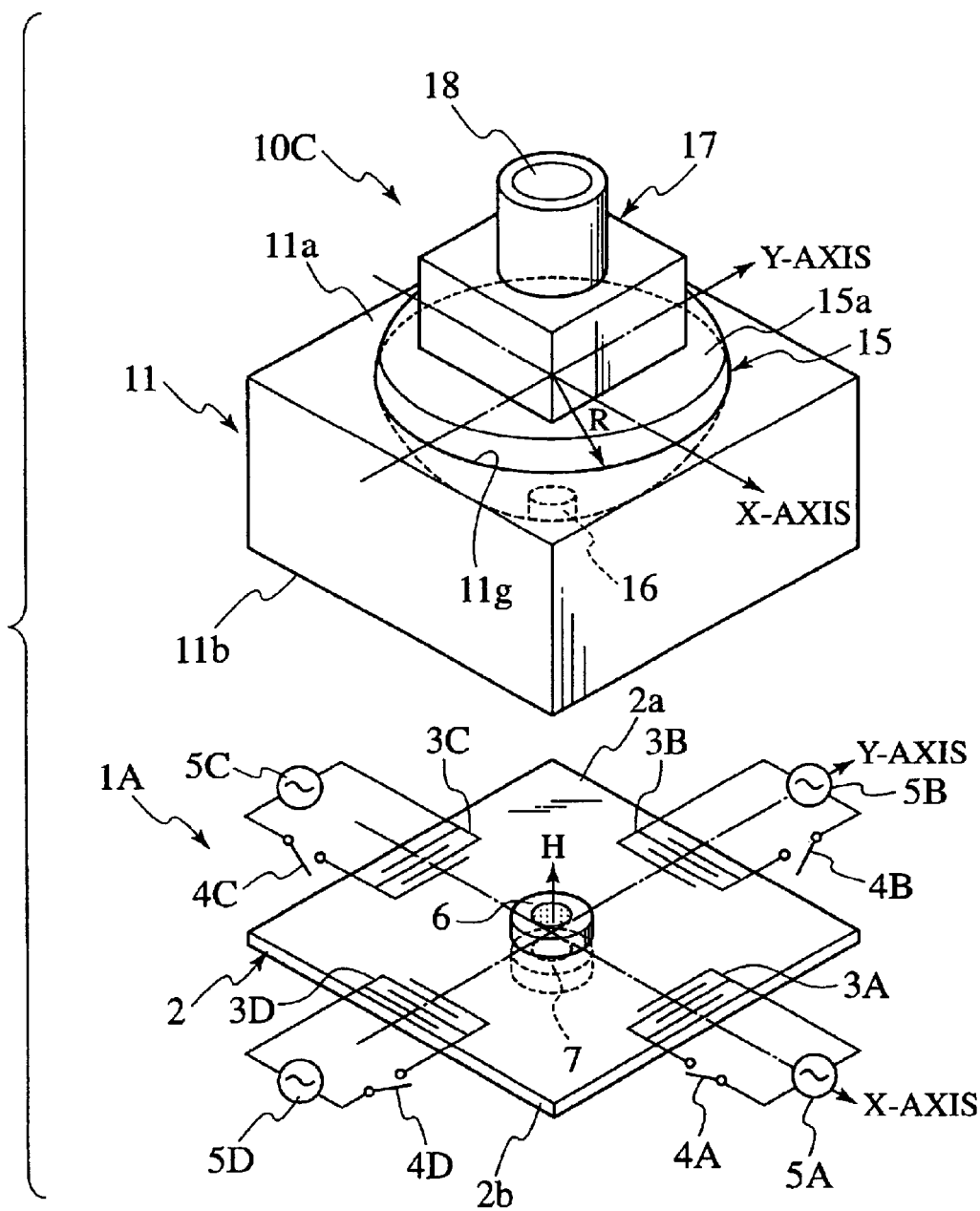
FIG. 11 is an exploded perspective view explaining an application of the deflector of FIG. 9.

FIG. 9 is an exploded perspective view explaining the deflector employing the surface acoustic wave actuator according to the present invention. FIG. 10 is a longitudinal section explaining operation of the deflector of FIG. 9. FIG. 11 is an exploded perspective view explaining an application of the deflector of FIG. 9. FIG. 12 is a longitudinal section explaining operation of the deflector of FIG. 11.

In FIG. 9, the deflector 10C employing the surface acoustic wave actuator according to the present invention has a deflector-body support 11 serving as a base. A top surface 11a of the deflector-body support 11 and an under surface 11b opposite to the top surface 11a have each a square shape. A space between the top surface 11a and the under surface 11b are surrounded with side faces 11c to 11f to define the rectangular parallelepiped deflector-body support 11. A semispherical bottomed recess 11g having a radius R from the center of the top surface 11a is opened in the deflector-body support 11 from the top surface 11a.

In the semispherical bottomed recess 11g of the deflector-body support 11, a semispherical deflector body 15 is received. The semispherical deflector body 15 is substantially semispherical, has a radius that is slightly smaller than the radius R of the semispherical bottomed recess 11g, and is made of nonmagnetic material. The semispherical deflector body 15 has a deflecting face 15a that is adjacent to the top surface 11a of the deflector-body support 11 and slightly upwardly protrudes from the top surface 11a. The deflecting face 15a is flat and is substantially in parallel with the top surface 11a.

A lower part of the semispherical deflector body 15 is provided with a magnetic member 16. The magnetic member 16 is on a Z-axis that passes through the center O of the deflecting face 15a and orthogonally crosses the deflecting face 15a. The magnetic member 16 is integral with the semispherical deflector body 15 and is oriented to the under surface 11b of the deflector-body support 11. As will be explained later in connection with operation of the deflector, the magnetic member 16 is displaced in the semispherical bottomed recess 11g of the deflector-body support 11, to wobble the deflecting face 15a of the semispherical deflector body 15 in X- and/or Y-axis directions.

Beside the under surface 11b of the deflector-body support 11, the surface acoustic wave actuator 1A explained with reference to FIGS. 3A and 3B is arranged. Since the top surface 2a of the piezoelectric board 2 faces the under surface 11b of the deflector-body support 11, the mover 6 set on the top surface 2a of the piezoelectric board 2 is close to the magnetic member 16 integrally arranged at the lower part of the semispherical deflector body 15 in the semispherical bottomed recess 11g. Since the components of the surface acoustic wave actuator 1A have already been explained, they are represented with the same reference numerals in FIGS. 9 to 12 and the detailed explanation thereof will be omitted.

In the vicinity of the under surface 11b of the deflector-body support 11, the modified surface acoustic wave actuator 1B explained with reference to FIGS. 4A and 4B may be arranged instead of the actuator 1A.

Operation of the deflector 10C having the above-mentioned arrangements will be explained with reference to FIG. 10. For example, the switch 4A at the right end on the X-axis is turned on in the surface acoustic wave actuator 1A installed in the vicinity of the under surface 11b of the deflector-body support 11. This applies high a frequency from the high-frequency power source 5A to the comb-shaped electrode 3A. At this time, the switch 4C at the left end on the X-axis is kept OFF. The high frequency applied only to the comb-shaped electrode 3A generates Rayleigh waves LW that advance toward the mover 6 set on the piezoelectric board 2 and move the mover 6 rightward substantially along the X-axis. At this time, the permanent magnet 6B in the mover 6 and the magnetic material 7B in the mover holder 7 attract each other on each side of the piezoelectric board 2 and together move rightward. An upward leakage magnetic field H from the permanent magnet 6B in the mover 6 attracts and moves the magnetic member 16 that is integral with the lower part of the semispherical deflector body 15 in the direction of an arrow mark. Then, the semispherical deflector body 15 inclines together with the magnetic member 16 in the counterclockwise direction by a. This results in inclining the deflecting face 15a of the semispherical deflector body 15 in the counterclockwise direction by a.

In this deflector 10C, too, one of the two comb-shaped electrodes (3A, 3C) arranged at the left and right ends on the X-axis and/or one of the two comb-shaped electrodes (3B, 3D) arranged at the upper and lower ends on the Y-axis are selectively applied with high frequencies. This operation moves the mover 6, and the leakage magnetic field H from the permanent magnet 6B in the mover 6 displaces the magnetic member 16 arranged at the lower part of the semispherical deflector body 15 toward the mover 6. As a result, the deflecting face 15a of the semispherical deflector body 15 wobbles in the X- and/or Y-axis directions. When the mover 6 is stopped, the deflecting face 15a of the semispherical deflector body 15 is maintained at an inclined position. Namely, an angular position of the deflecting face 15a can be maintained without consuming power. This results in reducing power consumption during the use of the deflector.

As shown in FIGS. 11 and 12, a video camera 17 may be attached in the semispherical deflector body 15 from the deflecting face 15a. When the surface acoustic wave actuator 1A (or 1B of FIGS. 4A and 4B) is activated, the deflecting face 15a of the semispherical deflector body 15 wobbles in the X- and/or Y-axis directions. Accordingly, a camera lens 18 attached to a front end of the video camera 17 wobbles two-dimensionally. This video camera 17 may be used as a monitoring video camera to monitor objects.

It should be understood that many modifications and adaptations of the invention will become apparent to those skilled in the art and it is intended to encompass such obvious modifications and changes in the scope of the claims appended hereto.

What is claimed is:

1. A surface acoustic wave actuator having a mover arranged on a first surface of a piezoelectric board and comb-shaped electrodes formed on the first surface, high frequencies being applied to the comb-shaped electrodes to generate Rayleigh waves that move the mover, comprising:

the com-shaped electrodes including first to fourth electrodes formed on the first surface of the piezoelectric board, the first and third comb-shaped electrodes being on each side of the mover on an X-axis, the second and fourth comb-shaped electrodes being on each side of the mover on a Y-axis;

the mover at least having a permanent magnet diposed so as to generate a magnetic field vertically to said piezoelectric board;

a unit configured to selectively apply a high frequency to at least one of two electrodes, one selected from the first and third comb-shaped electrodes and the other from the second and fourth comb-shaped electrodes; and a mover holder facing the mover with the piezoelectric board interposed therebetween, the mover holder at least having a magnetic material configured to hold the mover and being movable together with the mover.

2. A deflector comprising:

a surface acoustic wave actuator having a mover arranged on a first surface of a piezoelectric board and comb-shaped electrodes formed on the first surface, high frequencies being applied to the comb-shaped electrodes to generate Rayleigh waves that move the mover, including:

the comb-shaped electrodes including first to fourth electrodes formed on the first surface of the piezoelectric board, the first and third comb-shaped electrodes being on each side of the mover on an X-axis, the second and fourth comb-shaped electrodes being on each side of the mover on a Y-axis, the mover at least having a permanent magnet, a unit configured to selectively apply a high frequency to at least one of two electrodes one selected from the first and third comb-shaped electrodes and the other from the second and fourth comb-shaped electrodes, and a mover holder facing the mover with the piezoelectric board interposed therebetween, the mover holder at least having a magnetic material configured to hold the mover;

a deflector-body support;

a deflector body supported with a first surface of the deflector-body support and configured to wobble in at least one of X- and Y-axis directions;

a magnetic member arranged in a recess formed in the deflector-body support on an axis that passes through the center of a deflecting face of the deflector body and is orthogonal to the deflecting face, the magnetic member being configured to be displaced so as to wobble the deflecting face in at least one of the X- and Y-axis directions; and the surface acoustic wave actuator arranged beside a second surface of the deflector-body support that is opposite to the first surface, the magnetic member being displaced by a magnetic field that is generated in response to a movement of the permanent magnet of the mover in the surface acoustic wave actuator, to wobble the deflecting face of the deflector body.

* * * * *

UNITED STATES PATENT AND TRADEMARK OFFICE
CERTIFICATE OF CORRECTION

PATENT NO. : 6,949,868 B2
DATED : September 27, 2005
INVENTOR(S) : Iseki

It is certified that error appears in the above-identified patent and that said Letters Patent is hereby corrected as shown below:

<u>Column 16,</u>
Line 1, please delete "com-shaped" and replace with -- comb-shaped --.

Signed and Sealed this

Thirteenth Day of December, 2005

JON W. DUDAS
*Director of the United States Patent and Trademark Office*